(12) United States Patent
Hunter et al.

(10) Patent No.: US 8,136,453 B2
(45) Date of Patent: Mar. 20, 2012

(54) LINEAR MOTOR DRIVEN SYSTEM AND METHOD

(75) Inventors: Richard D. Hunter, Ottawa (CA); Andreas Tanzer, Gatineau (CA)

(73) Assignee: HM Attractions Inc. (CA)

( * ) Notice: Subject to any disclaimer, the term of this patent is extended or adjusted under 35 U.S.C. 154(b) by 656 days.

(21) Appl. No.: 11/681,702

(22) Filed: Mar. 2, 2007

(65) Prior Publication Data

US 2007/0207866 A1    Sep. 6, 2007

Related U.S. Application Data

(60) Provisional application No. 60/778,384, filed on Mar. 3, 2006.

(51) Int. Cl.
*A63G 1/00* (2006.01)
(52) U.S. Cl. .............................. 104/60; 104/53; 104/73
(58) Field of Classification Search .................... 104/53, 104/56, 59, 63, 64, 69, 70, 72, 73, 290, 292
See application file for complete search history.

(56) References Cited

U.S. PATENT DOCUMENTS

| | | | |
|---|---|---|---|
| 3,404,635 A | 10/1968 | Bacon et al. | |
| 3,577,928 A * | 5/1971 | Victorri | 104/292 |
| 3,585,939 A | 6/1971 | Laithwaite et al. | |
| 3,667,397 A * | 6/1972 | Haynes | 104/294 |
| 3,667,398 A * | 6/1972 | English | 104/294 |
| 3,770,995 A * | 11/1973 | Eastham et al. | 104/294 |
| 3,830,161 A * | 8/1974 | Bacon | 104/70 |
| 3,947,741 A | 3/1976 | Ball et al. | |
| 3,952,666 A | 4/1976 | Gladish | |
| 4,063,517 A | 12/1977 | Nardozzi, Jr. | |
| 4,233,906 A | 11/1980 | Seiler | |
| 4,299,171 A * | 11/1981 | Larson | 104/70 |
| 4,484,739 A * | 11/1984 | Kreinbihl et al. | 472/88 |
| 4,991,514 A * | 2/1991 | Powell et al. | 104/60 |
| 5,277,125 A | 1/1994 | DiFonso et al. | |
| 5,403,238 A * | 4/1995 | Baxter et al. | 472/43 |
| 5,433,671 A * | 7/1995 | Davis | 472/117 |
| 5,540,622 A * | 7/1996 | Gold et al. | 472/117 |
| 5,860,364 A * | 1/1999 | McKoy | 104/59 |
| 6,237,499 B1 * | 5/2001 | McKoy | 104/59 |
| 6,354,223 B2 * | 3/2002 | McKoy | 104/72 |
| 6,397,755 B1 * | 6/2002 | Kamler | 104/53 |
| 6,413,165 B1 * | 7/2002 | Crandall et al. | 472/117 |
| 6,485,372 B2 * | 11/2002 | Stuart et al. | 472/117 |
| 6,629,501 B2 * | 10/2003 | McKoy | 104/72 |

(Continued)

FOREIGN PATENT DOCUMENTS

CA           2473804         8/2003

(Continued)

OTHER PUBLICATIONS

International Search Report for PCT/CA2007/000333, dated Jun. 15, 2007.

(Continued)

*Primary Examiner* — S. Joseph Morano
*Assistant Examiner* — Jason C Smith
(74) *Attorney, Agent, or Firm* — Barnes & Thornburg LLP

(57) ABSTRACT

A vehicle motion control system comprising: a sliding surface; a vehicle adapted to slide on said sliding surface; and a linear motor associated with the vehicle and the sliding surface for affecting sliding motion of the vehicle on the sliding surface.

59 Claims, 13 Drawing Sheets

U.S. PATENT DOCUMENTS

| | | | | |
|---|---|---|---|---|
| 6,659,237 | B1 * | 12/2003 | Pribonic | 188/165 |
| 6,856,048 | B2 | 2/2005 | Funken et al. | |
| 6,857,964 | B2 * | 2/2005 | Hunter | 472/116 |
| 6,860,209 | B2 * | 3/2005 | McKoy | 104/72 |
| 6,971,317 | B2 * | 12/2005 | McKoy | 104/72 |
| 7,056,220 | B2 * | 6/2006 | Hunter | 472/117 |
| D548,810 | S * | 8/2007 | Hunter | D21/821 |
| D567,322 | S * | 4/2008 | Hunter | D21/821 |
| 7,371,183 | B2 * | 5/2008 | Henry et al. | 472/117 |
| 7,437,998 | B2 | 10/2008 | Burger et al. | |
| 7,597,630 | B2 * | 10/2009 | Henry | 472/128 |
| 7,713,134 | B2 * | 5/2010 | Hunter | 472/117 |
| 7,740,542 | B2 * | 6/2010 | Henry et al. | 472/128 |
| 2002/0142851 | A1 * | 10/2002 | Hunter | 472/117 |
| 2004/0077426 | A1 * | 4/2004 | Hunter | 472/137 |
| 2005/0098057 | A1 * | 5/2005 | McKoy | 104/53 |
| 2005/0192108 | A1 * | 9/2005 | Hunter | 472/117 |
| 2005/0288112 | A1 * | 12/2005 | Hunter | 472/117 |
| 2006/0219124 | A1 | 10/2006 | Jordan | |
| 2007/0034106 | A1 * | 2/2007 | Miller et al. | 104/286 |
| 2007/0060403 | A1 * | 3/2007 | Henry et al. | 472/117 |
| 2007/0204759 | A1 * | 9/2007 | Hunter | 104/292 |
| 2007/0207866 | A1 * | 9/2007 | Hunter | 472/43 |
| 2007/0207867 | A1 * | 9/2007 | Hunter | 472/43 |
| 2007/0207869 | A1 * | 9/2007 | Hunter | 472/117 |

FOREIGN PATENT DOCUMENTS

| | | |
|---|---|---|
| DE | EP 0 487 744 | 6/1991 |
| DE | 4344755 | 6/1995 |
| GB | 1307833 | 2/1973 |
| JP | 54035914 | 3/1979 |
| JP | 3027703 | 2/1991 |
| WO | 9831444 | 7/1998 |
| WO | 2004085744 | 10/2004 |

OTHER PUBLICATIONS

Chinese office action in Chinese Patent Application No. 200780007714.3 (3 pages), with 3 pages of English translation.

Jan. 20, 2010 Office Action in European Patent Application No. 07 250 876.5-2318 (4 pages).

USPTO Official Action dated Dec. 9, 2010, issued in connection with U.S. Appl. No. 11/681,712, filed Mar. 2, 2007.

International Search Report for PCT/CA2007/000329, dated Jun. 5, 2007.

European Search Report for EP 07250876, dated Jun. 5, 2007.

* cited by examiner

LINEAR MOTOR DRIVEN SYSTEM AND METHOD

RELATED APPLICATIONS

This application claims the benefit of U.S. Provisional Application Ser. No. 60/778,384 filed Mar. 3, 2006, which is incorporated herein by reference in its entirety.

FIELD OF THE INVENTION

This invention relates generally to systems driven by linear motors, and in particular to systems and methods of moving vehicles utilizing linear motors.

BACKGROUND OF THE INVENTION

In the past few decades, water-based amusement rides have become increasingly popular. Such rides can provide similar thrills to roller-coaster rides, with the additional features of the cooling effect of water and the excitement of being splashed.

The most common water-based amusement rides are flume-style waterslides in which a participant slides along a channel or "flume", either on his or her body, or on or in a vehicle. Water is provided in the flume to provide lubrication between the body/vehicle and the flume surface, and to provide the above-mentioned cooling and splashing effects. Typically, the motion of the participant in the flume is controlled predominantly by the contours of the flume (hills, valleys, turns, drops, etc.) in combination with gravity.

As thrill expectations of participants have increased, demand for greater control of participants' movement in the flume has correspondingly increased. Thus various techniques have been applied to accelerate or decelerate participants by means other than gravity. For example, a participant may be accelerated or decelerated using powerful water jets. Other rides use a conveyor belt to convey a participant to the top of a hill the participant would not otherwise crest on the basis of his or her momentum alone. For safety reasons, such techniques are generally used only on waterslides where the participant slides along the flume in a vehicle.

However, such existing means of controlling the movement of a participant raise safety and comfort concerns even when he or she is riding in a vehicle. For example, a water jet powerful enough to affect the motion of a waterslide vehicle could injure the participant if he or she is hit in the face or back of the head by the jet, as might be the case if the participant falls out of the vehicle. Similarly, a participant extending a limb out of a vehicle could be injured by a fast-moving conveyor belt.

These same issues arise in other systems for transporting people and objects. For example, in warehousing or manufacturing facilities conveyor belts and rollers have been used to transport objects in the facility. These systems have limited flexibility and control and may cause safety concerns. In public transmit of people, vehicles rolling on rails have been used.

SUMMARY OF THE INVENTION

In a broad aspect, the invention provides a vehicle motion control system comprising: a sliding surface; a vehicle adapted to slide on said sliding surface; and a linear motor associated with the vehicle and the sliding surface for affecting sliding motion of the vehicle on the sliding surface.

In another broad aspect, the invention provides a method of controlling motion of a vehicle sliding on a sliding surface comprising operating a linear motor associated with the vehicle and the sliding surface.

In another broad aspect, the invention provides a vehicle motion control system for an amusement ride comprising: a sliding surface; a vehicle adapted to slide on said sliding surface; and a linear motor associated with the vehicle and the sliding surface for affecting sliding motion of the vehicle on the sliding surface.

BRIEF DESCRIPTION OF THE DRAWINGS

Embodiments of the invention will now be described with reference to the attached drawings in which.

DETAILED DESCRIPTION OF THE DRAWINGS

The present invention is directed to systems in which participants or objects ride in vehicles which slide on a sliding surface. As the term is used in this application, "sliding" refers to the action of moving substantially smoothly along a weight-bearing sliding surface while remaining substantially in contact with it. This is in contrast to "rolling" which refers to the action of moving along a weight bearing riding surface by the relative rotation of wheels, rollers or bearings.

In a waterslide context, sliding is typically facilitated by the use of water as a lubricant between the vehicle and the sliding surface. In such cases, on occasion, such as when the layer of water has sufficient depth or lubrication and the vehicle has sufficient speed, direct contact between the vehicle and the flume may be lost very briefly and temporarily with the vehicle skimming atop a very thin layer of water. However, such temporary skimming is still considered to fall within the meaning of sliding.

Embodiments of the invention will now be described.

Flume-style waterslides typically consist of a channel or "flume" supplied with water and which accommodates a vehicle for sliding therein. The flume typically has hills and valleys as well as turns to increase the excitement of the ride for the participant.

Figure 1:
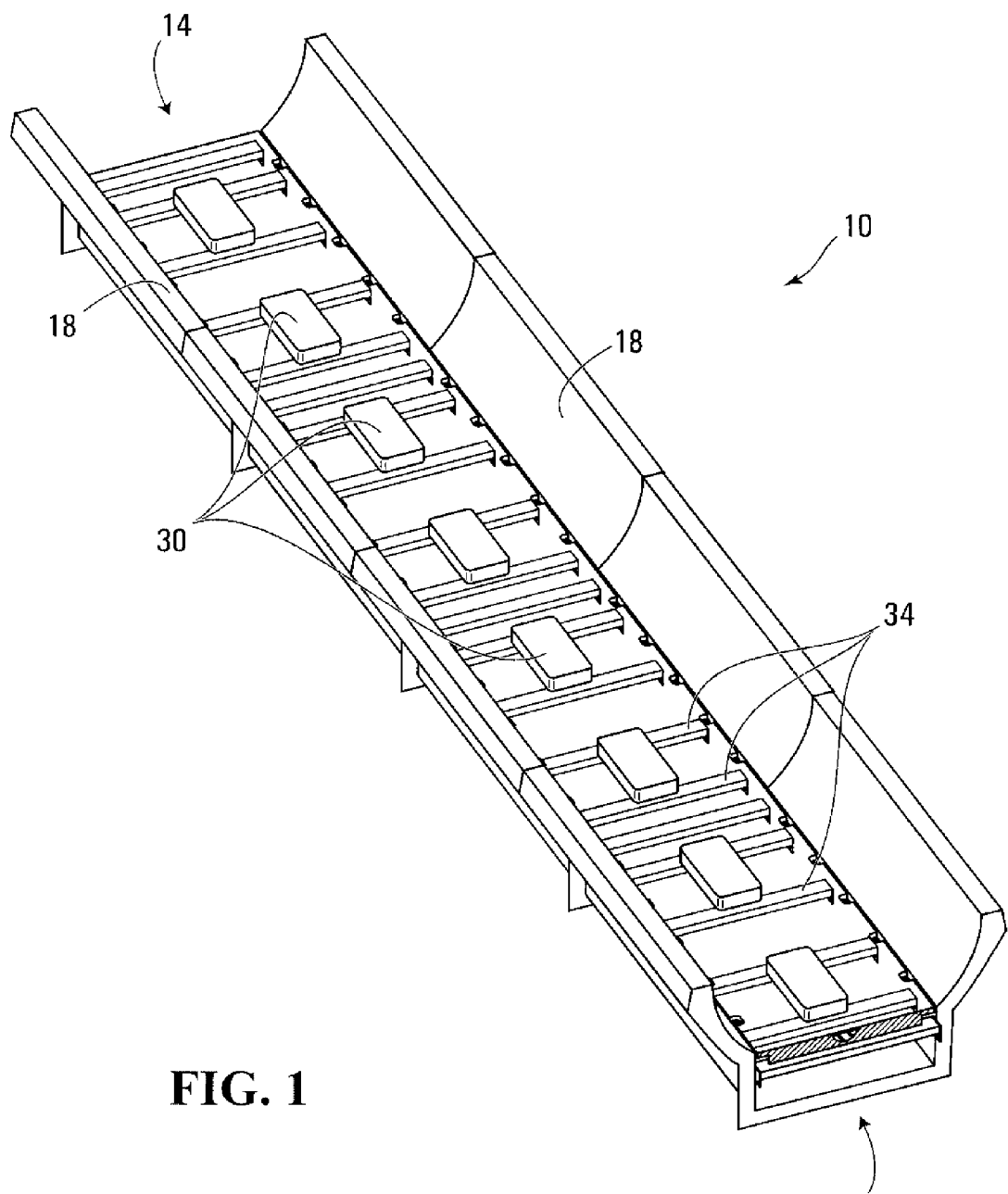
FIG. 1 is a perspective view of an uphill section of a flume of an embodiment of the present invention with a sliding surface of the flume removed to show components underneath.
Figure 2:
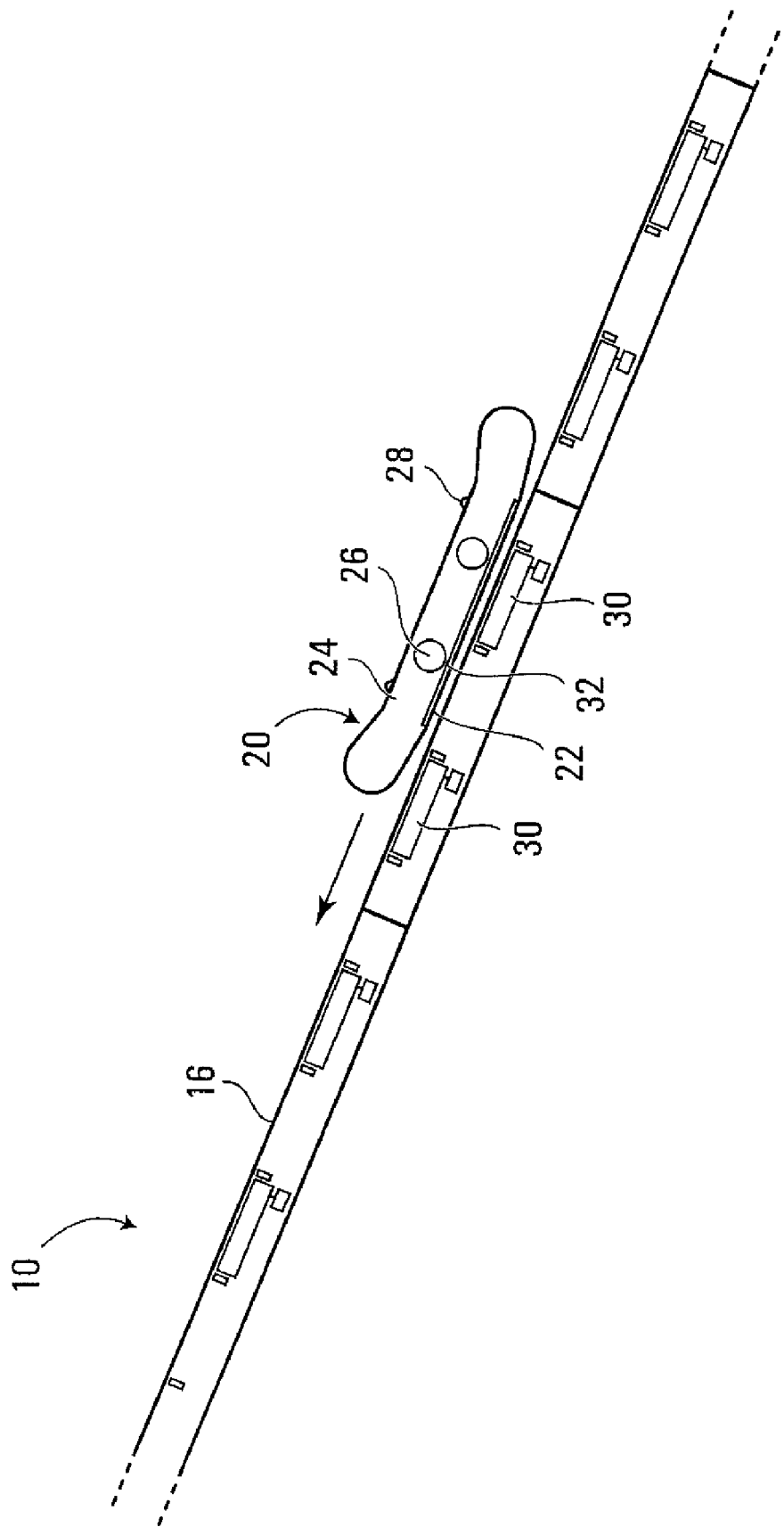
FIG. 2 is a side cross-sectional view of a portion of the uphill flume section of FIG. 1 with the side walls of the flume removed to show a vehicle thereon.
Figure 3:
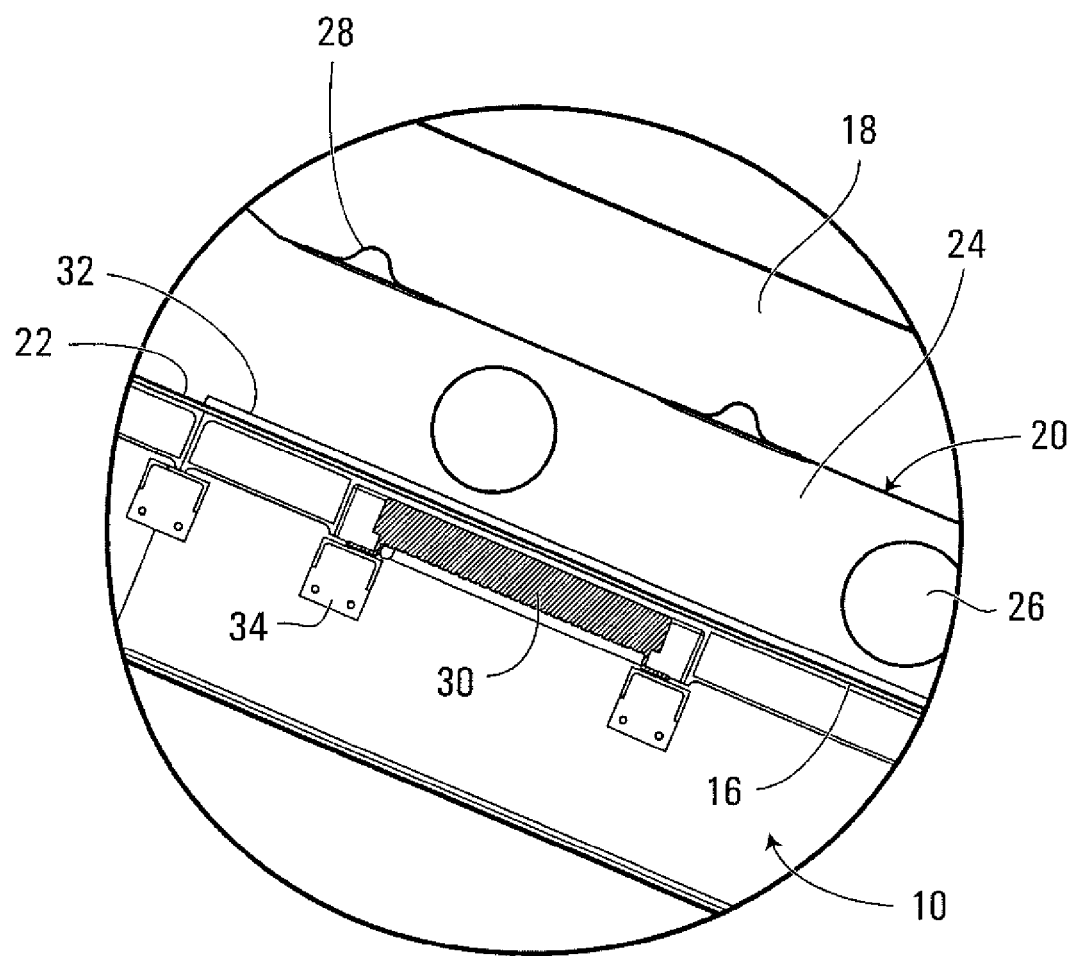
FIG. 3 is an enlarged side cross-sectional view of a portion of the uphill flume section of FIG. 1 with the vehicle sliding thereon.
Figure 4:
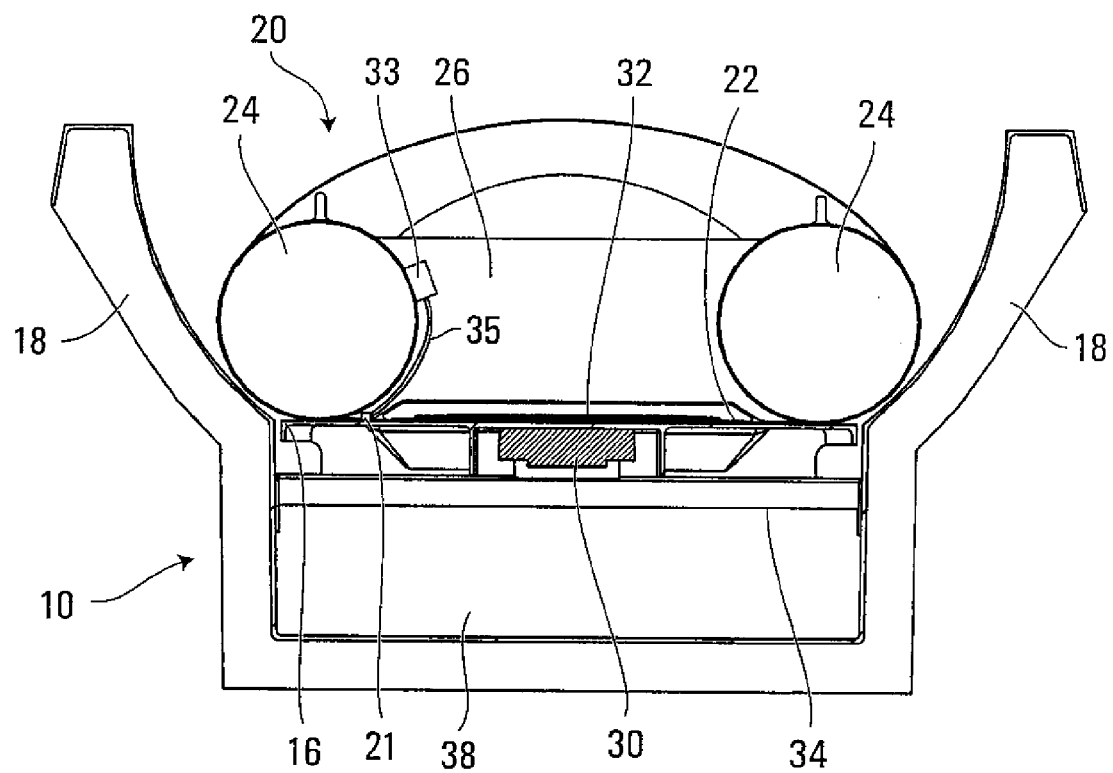
FIG. 4 is a cross-sectional end view of the portion of the uphill flume section shown in FIG. 1 with the vehicle sliding thereon.

FIGS. 1 to 4 show an exemplary uphill section of such a flume 10 in accordance with an embodiment of the invention. In FIGS. 1 and 2, a vehicle 20 would normally move from the right to the left. In operation, the section illustrated in FIG. 1 is connected at its entry 12 and exit 14 ends to other sections of the flume ride so as to provide a continuous flume from start to finish of the ride. The illustrated section would also normally be supported underneath by appropriate framing (not shown), or by a sloped section of land (not shown).

The flume 10 itself generally consists of a sliding surface 16 (removed in FIG. 1 to illustrate components therebeneath), as well as two side walls 18 (removed in FIG. 2 to show the vehicle 20). The sliding surface 16 is the surface on which the vehicle 20 slides, while the side walls 18 assist in ensuring that the vehicle 20 and sufficient lubricant, in this example water, remains in the flume 10. In this embodiment, the surface has approximately 1 to 3 mm of water. The sliding surface 16 and side walls 18 may be made of any material providing sufficient toughness and rigidity, and may be smooth so as to permit easy sliding of the vehicle 20 thereon.

The sliding surface 16 and side walls 18 may be made of fiberglass. Examples of fiberglass include a combination of a neo-isothalic gelcoat chop stand E-Glass or S-Glass fiber, woven roving and isothalic and orthothalic resins.

In this embodiment, the vehicle 20 is a raft adapted to carry one or more riders thereon and is provided at its bottom with a vehicle bottom surface 22 adapted to slide along the sliding surface 16 of the flume 10 during normal operation. The vehicle 20 in this embodiment has side tubes 24, thwarts 26 and handles 28.

In the present embodiment flume ride, means are provided to impart a thrusting force to the vehicle 20 to assist it up the illustrated uphill section of the flume 10. Such a force is desirable for example where the speed of the vehicle 20 arriving at the entry end 12 of the illustrated section from other parts of the flume ride is not sufficient to propel the vehicle 20 to the exit end 14 of the illustrated section at a desired speed, on the basis of the vehicle's momentum alone. To provide the external force necessary to achieve the desired speed at the exit end 14 of the illustrated flume section 10, a linear motor is used.

There exist many types of linear motors, including linear induction motors (LIMs) and linear synchronous motors, suitable for the present application. The exemplary linear motor used in the illustrated embodiment is a squirrel cage style linear induction motor.

Conceptually, the linear induction motor of the embodiment is a standard rotary squirrel cage motor which has been opened out flat with the stator units lying in a spaced linear configuration and the rotor being replaced by a flat reaction plate. The units of the stator, known as linear induction motor units ("LIM units") when laid out flat, each consist of a 3 phase winding around a laminated iron core. When the LIM units are energized by an alternating current (AC) supply, a traveling wave magnetic field is produced. While a rotary motor effects rotary movement in a rotor, the flat stator of the linear induction motor effects linear movement in the reaction plate.

The reaction component or plate in such LIMs is typically a sheet of any electrically conductive metal, for example aluminum or copper. The conducting sheet may be backed by a sheet of ferromagnetic substantially non-electrically conductive metal, such as steel or iron, to enhance the performance of the reaction plate by providing return paths for the stator's magnetic flux. Currents induced in the reaction plate by the LIM units' traveling field create a secondary magnetic field. It is the reaction between these two magnetic fields which imparts the linear thrust to the reaction plate. The magnitude of the thrust imparted to the reaction plate is controlled largely by the voltage and frequency of the electrical supply to the LIM units and the dimensions and materials of the reaction plate. In this embodiment, the reaction plate 32 is a ⅛" sheet of 1050, 1100, 1200 or 5005 aluminum and a 3/32" sheet of A36 galvanized steel affixed above the sheet of aluminum. Also in this embodiment, an inverter supplies a controlled amount of power to the LIMs which controls the amount of thrust applied to the reaction plates. The thrust can be reversed if the polarity of the power to the motor is charged.

In the context of a waterslide amusement ride, a LIM can control various aspects of the motion of a vehicle to which the reaction plate is affixed, depending on the configuration of the LIM units and the shape of the reaction plate. For example, the LIM can accelerate or decelerate the vehicle. It can also maintain the speed of the vehicle as it proceeds up an incline, or cause it to turn around corners. If the reaction plate is circular, it can also cause the vehicle to rotate.

In the exemplary embodiment shown in the FIGS. 1 to 4, the LIM units 30 are located under the sliding surface 16 of the flume 10 in spaced linear relationship in the direction of travel of the ride vehicle 20, and the reaction plate 32 is mounted at the bottom of the vehicle 20.

As shown in FIGS. 1 to 4, each LIM unit 30 of this embodiment is rectangular in shape and is substantially flat. In the present embodiment, the dimensions of each LIM unit are 500 mm in length, 250 mm in width, and 85 mm in height and provides a thrust of GOON at 480V, 60 Hz AC current and 20% duty cycle. Of course other dimensions, other voltages, other frequencies and other duty cycles may be used to provide a required thrust.

The LIM units 30 are mounted longitudinally to a flume frame 34 such that they are located just beneath the sliding surface 16 and substantially centered between the side walls 18. The upper surface of the LIM units 30 may alternatively form part of the sliding surface 16. In order to reduce cost, each LIM unit 30 is spaced from adjacent LIM units 30. In this embodiment, the LIM units 30 are spaced 571.5 mm apart.

The reaction plate 32 is also substantially flat and elliptical or rectangular. In the preferred embodiment the reaction plate 32 is a ⅛" sheet of aluminum and a 3/32" sheet of galvanized steel affixed above the sheet of aluminum. The reaction plate 32 is 72" in length and 18" in width, with the width of the steel sheet being 2" narrower than the aluminum sheet such that the aluminum sheet extends beyond the width of the steel sheet by 2" on each side. Examples of suitable reaction plates are detailed in a co-owned application entitled "Reaction Component for a Linear Induction Motor" filed concurrently with the present application and incorporated herein by reference in its entirety.

The reaction plate 32 is affixed at the bottom of the vehicle 20 and may be covered by the vehicle bottom surface 22 so as to provide a smooth interface between the vehicle bottom surface 22 and the flume sliding surface 16. The distance between the reaction plate 32 and the LIM units 30 may be minimized to increase the force imparted on the vehicle 20 by the LIM units. In the present embodiment, the bottom surface 22 of the vehicle is made of vinyl rubber, and the gap between the reaction plate 32 and the LIM units 30 is about ⅜"-⅝"

during operation. The weight of the riders may be distributed to minimize the gap along the length of the vehicle; for example, in a three person vehicle, if only two people are riding, they ride at the front and back, if only one person is riding, they ride in the middle.

As shown in FIG. 1, the flume 10 is provided with support structures such that the sliding surface 16 is supported by the flume frame 34. A conduit 38 is provided below the sliding surface 16 to accommodate electrical wires (not shown) and to allow water seeping between the sliding surface 16 and the side walls 18 to flow downhill. All electrical elements are sealed and are double ground faulted to ensure safety.

Figure 5:
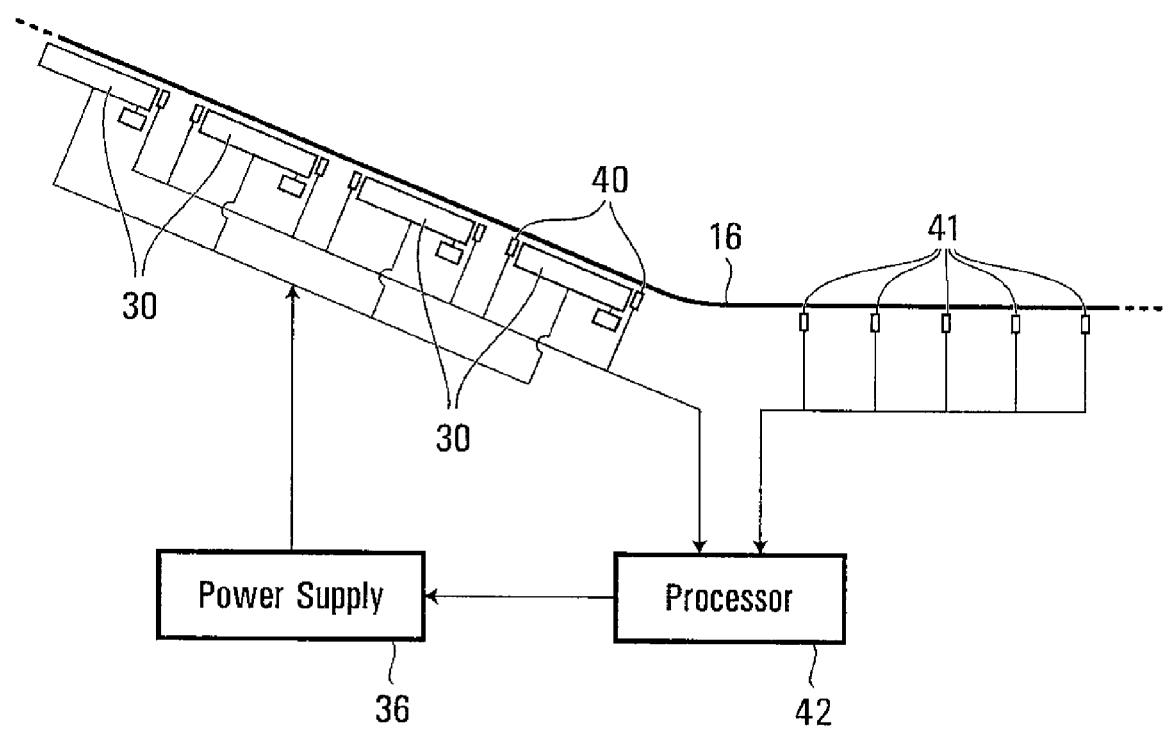
FIG. 5 is a schematic view of an exemplary control system for the uphill flume section of FIG. 1.

Referring to FIG. 5, the LIM units 30 are electrically connected to a controlled power supply 36. The flume 10 in this embodiment is also provided with proximity sensors 41 upstream of the section illustrated in FIGS. 1 and 2, and proximity sensors 40 throughout the section illustrated in FIGS. 1 and 2 such that the voltage and/or frequency of the electrical supply to the LIM units 30 can be varied as a function of the speed of the vehicle to ensure that the vehicle arrives at the exit end 14 of the illustrated section at the desired speed. Such speed sensors may be, for example, inductive proximity detectors.

The vehicle 20 may also incorporate a control panel 33. The control panel 33 may be connected by connectors 35 to sensors 21 mounted remotely at the bottom of the slide 38. The rider can operate the control panel 33 and provide input to the processor 42 to influence the intensity of the magnetic field allowing for a slower or faster speed in the uphill sections of the flume. If the plate is replaced with conductive coils, and the control panel is connected to the conductive coils, the rider can operate the control pane to provide input to affect the electrical characteristics and thus operation of the conductive coils. The rider, if the coils or plate is of appropriate flexibility, can also use the handles 28 to flex the vehicle 20 to change the shape of the reaction plate 32 and accordingly influence the ride.

In operation, the illustrated flume section 10 is provided with water using any of a number of known means, for example recessed water jets located in the side walls, water flowing from a higher point in the flume, etc. The water provides lubrication between the bottom surface 22 of the vehicle and the sliding surface 16 of the flume 10 so as to facilitate the sliding movement of the vehicle 20 up the section.

At the start of the ride, the vehicle 20 is launched from a launching station (not shown) of the flume and proceeds along the flume. As shown in FIG. 5, the LIM is controlled by a drive controller or processor 42. In particular, as the vehicle 20 approaches the illustrated section, the proximity sensors 41 mounted upstream of the illustrated section measure the speed, between each of these proximity sensors, of the vehicle 20. This information is communicated to a processor 42 which calculates, based on the measured speed, a voltage and frequency to be supplied to the LIM units 30 which would likely exert sufficient force to ensure that the vehicle 20 arrives at the exit end 14 of the illustrated flume section 10 at the desired speed. In order to improve the accuracy of this calculation, vehicle weight detectors (not shown) may also be utilized. The processor then causes the power supply 36 to supply this voltage and frequency to the LIM units 30. The LIM units 30 are powered successively as the vehicle is sensed by the proximity sensors 40. The LIM units may be powered, for example, individually, in pairs, or three at a time with variable power levels. This way the amount of power that is used by the system is minimized and the power is concentrated under the vehicle where the reaction plate 32 is located.

As the vehicle 20 mounts the illustrated flume section 10, the magnetic field generated by the LIM units 30 provides a linear thrust to the reaction plate 32 affixed to the bottom of the vehicle 20, causing the vehicle 20 to maintain its speed, or accelerate up the illustrated section 10. As the vehicle 20 proceeds up the illustrated section 10, the proximity sensors 40 measure the speed of the vehicle 20 and the power supply to the LIM units 30 is adjusted accordingly.

While the sensors 40 and 41 discussed above sense a linear speed of the vehicle 20, other sensors could be used to measure one or more motion parameters of the vehicle such as linear speed, rotational speed, and direction of movement of the vehicle 20, and cause the LIM units 30 to operate so as to affect motion of the vehicle 20 in a desired manner, for example by decelerating the vehicle 20, slowing its rotation, or changing its direction of motion.

As described, the illustrated embodiment reduces the need for a direct contact outside force on the vehicle 20 to assist it up the incline, a feature which improves the safety of the ride while also increasing its rider comfort and aesthetic appeal.

While this embodiment has been described as an amusement ride feature, it is to be understood that the present invention also contemplates an amusement ride embodying such an amusement ride feature, a method of using a LIM to affect motion of a vehicle in an amusement ride, a ride vehicle having a reaction plate for use on a LIM-enabled ride, and a LIM-enabled sliding surface having LIM units mounted thereebeneath.

While this embodiment ride has been described as being a waterslide ride, it is to be understood that the present invention can be applied in non-water sliding amusement rides, including so-called dry rides. One example would be a ride in which a vehicle slides on a sliding surface having a low-friction coating such as TEFLON™. The system also applies general to systems for sliding vehicles, whether lubricated or not, utilizing a linear motor.

Figure 6:
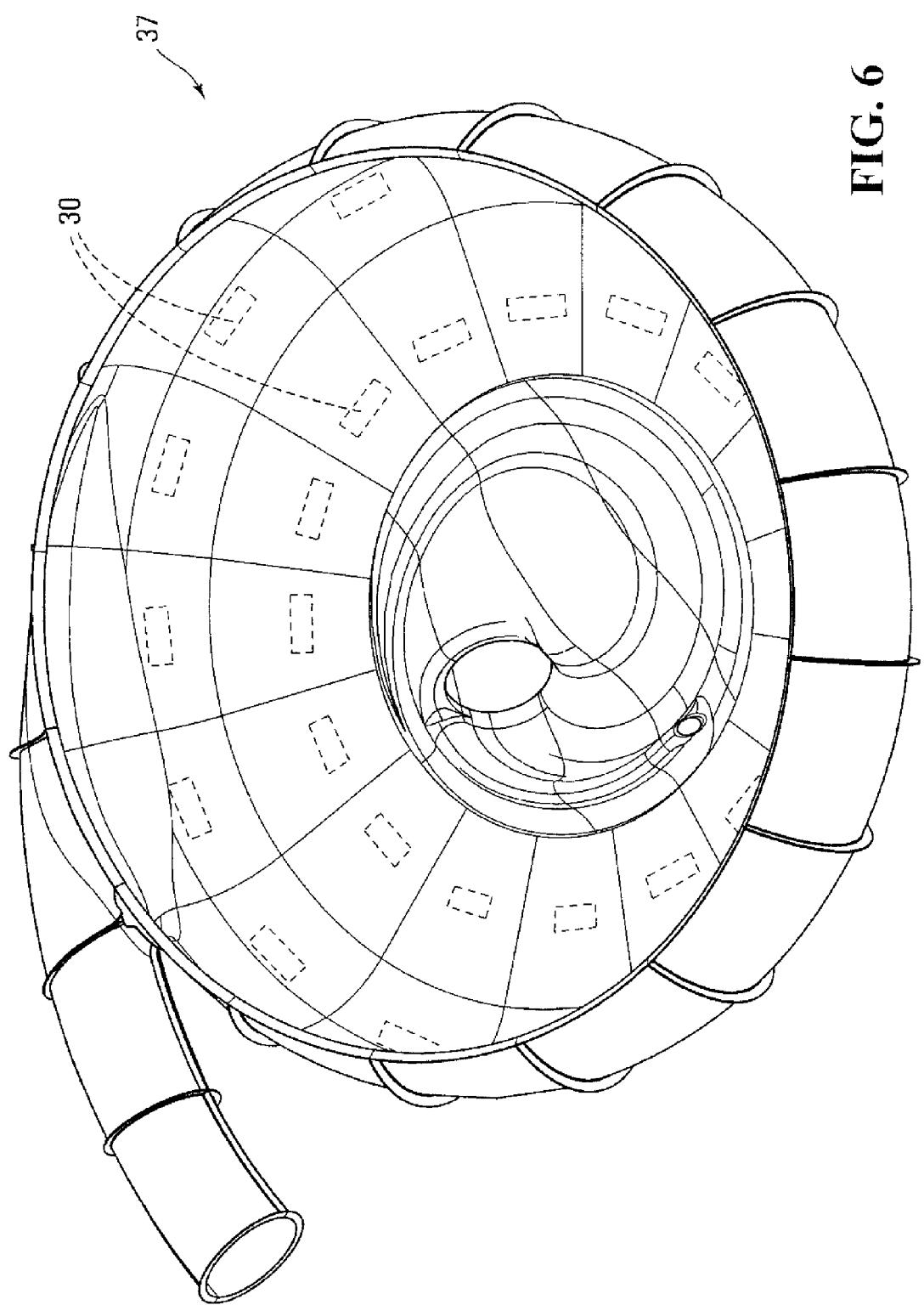
FIG. 6 is a perspective view of a bowl of a second embodiment of the present invention.

Further, although the first embodiment of the present invention has been described in detail in the context of a flume ride, it is to be understood that the present invention may also be applied to other types of sliding amusement rides. For example, FIG. 6 is an illustration of a bowl-style ride 31 or ride feature in which LIM units 30 are embedded around the bowl. Such a bowl-style ride is described in U.S. Design Pat. No. D521,098, issued May 16, 2006, incorporated herein by reference in its entirety. The LIM units 30 can be successively energized to maintain a ride vehicle's motion, including acceleration/deceleration and angular/linear speed, around the bowl before it is released and allowed to corkscrew towards the middle. The LIM units 30 may also be situated to define an upper limit beyond which a vehicle may not travel. This may form an added safety feature or be used in place of the rounded upper contour of the bowl ride 31. The LIM's may be energized successively or be energized dependent on the location of the vehicle in the flume. The operator may control the path of a vehicle to ensure that the path is maintained and each vehicle moves along the same path. Conversely, the operator could vary the vehicle path, by energizing the appropriate LIM to move the vehicle into a selected path.

Figure 7:
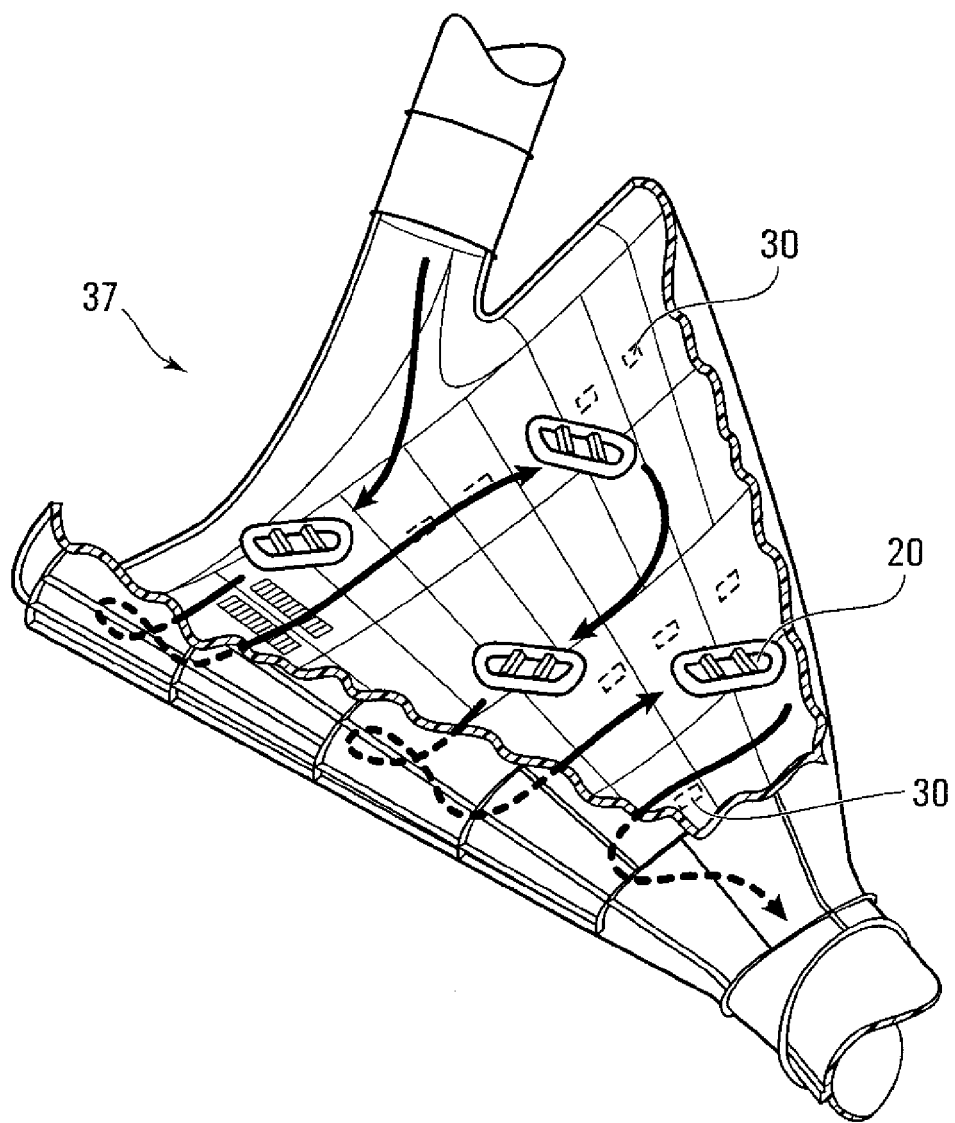
FIG. 7 is a perspective partial cut-away view of a funnel of a third embodiment of the present invention.

FIG. 7 illustrates a funnel-style ride or ride feature 37 in which LIM units 30 are embedded along the sides so as to increase or decrease the amplitude with which the ride vehicle oscillates along the funnel. LIM units 30 can also be embedded at the funnel exit to decrease the speed of the vehicle 20 exiting the funnel. This funnel-style ride is a completed funnel turned on its side and in FIG. 7, an upper side portion of the funnel has been cut away for the sole purpose of showing interior features. Such a funnel ride is described in U.S. Pat. No. 6,857,964 issued Feb. 22, 2005, U.S. Pat. No. 7,056,220 issued Jun. 6, 2006, and in co-pending U.S. application Ser. No. 11/381,557 filed May 4, 2006, each of which is incorporated herein by reference in its entirety.

Figure 8:
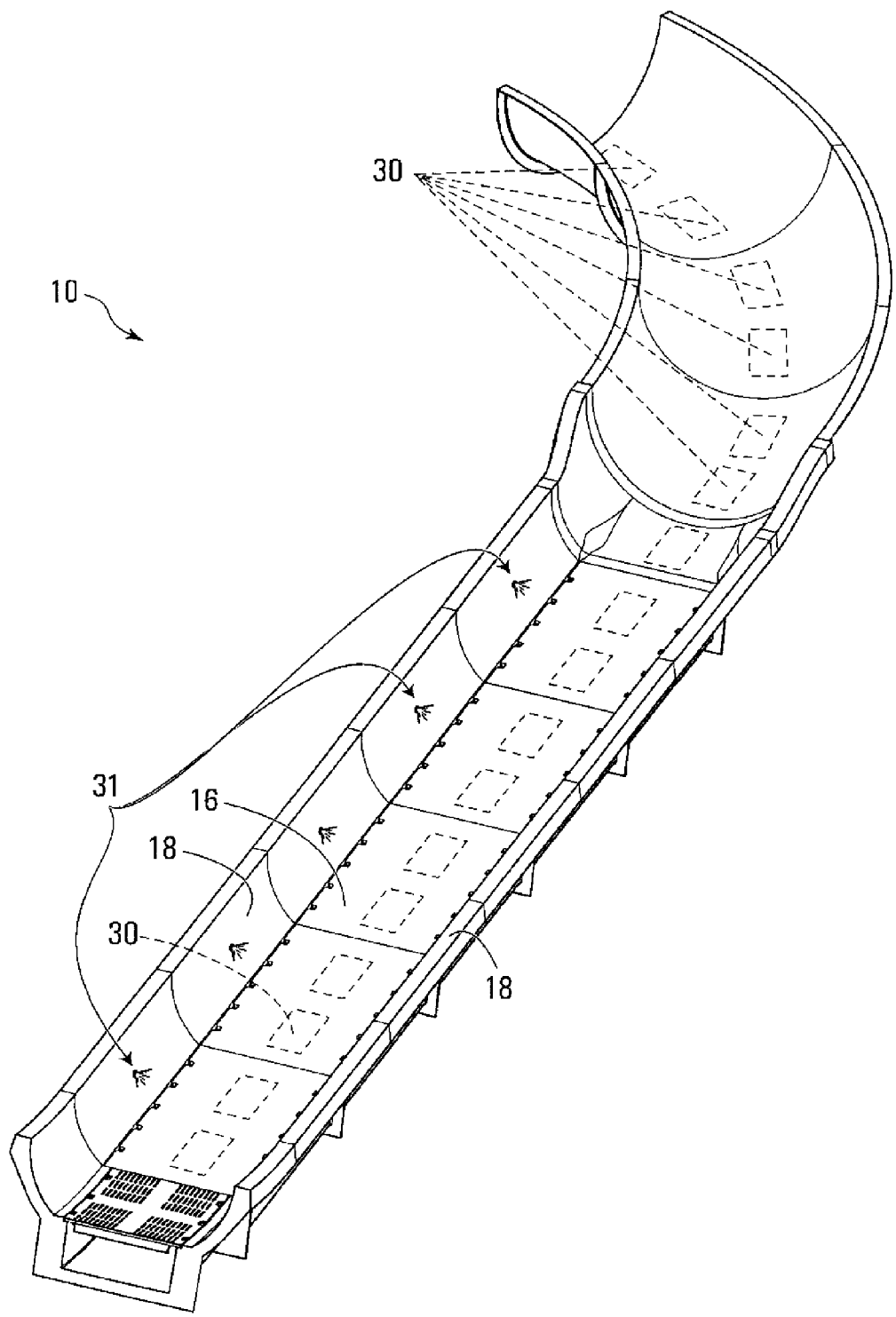
FIG. 8 is a perspective view of an uphill flume section of a fourth embodiment of the present invention.

In an alternative embodiment flume ride feature illustrated in FIG. 8, the invention may be used to accelerate a ride vehicle up a straight incline followed by a curving incline. The reference characters used in FIG. 8 correspond to the reference characters used in FIG. 1. FIG. 8 includes spray nozzles 31. The spray nozzles 31 may spray high pressure water which assists the LIM in guiding the raft up the incline. The spray nozzles 31 may also be used to provide water to lubricate the sliding surface 16. Other examples of how the sliding surface may be lubricated include water outlets in the sliding surface 16 or a water source introducing water from a higher elevation of the ride rather than being a flume amusement ride, the embodiment of FIG. 8 could also be an industrial conveyance system or a public transportation system for people. In such examples, the lubricant may be other then water. The vehicle could be other than a raft. For example, a pallet in an industrial system, or an enclosed car for public transportation.

While the first embodiment has been described as being an uphill section in the middle of a ride, it will be understood that the present invention can be applied in other sections of an amusement ride. For example, the LIM units 30 may be embedded in a horizontal section at the launch station to accelerate the ride vehicle 20 and launch it into the ride. Alternatively, LIM units 30 may be embedded in an uphill section near the launch station so as to either take a ride vehicle 20 containing a rider to the top of a first hill, or to return an empty vehicle 20 to an elevated launch station. Further, LIM units 30 may be embedded at the end of a ride so as to slow down the vehicle 20 as it approaches the end of the ride, or the launch station. Indeed LIM units 30 may be embedded in downhill sections to control the rate of descent of the ride vehicle 20.

Figure 9:
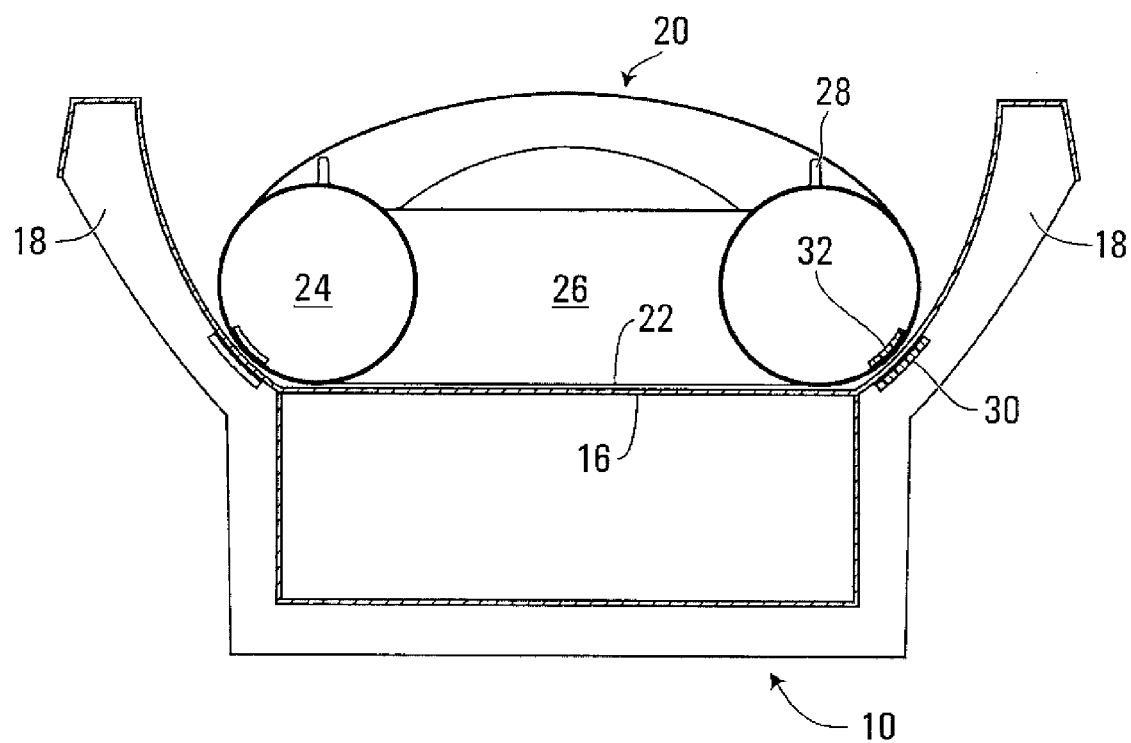
FIG. 9 is a cross-sectional end view of a fifth embodiment of the present invention.

Other modifications are possible. For example, instead of the ride vehicle 20 having only one reaction plate 32, it may have multiple reaction plates 32. Further, as illustrated in FIG. 9, instead of the LIM units 30 being mounted beneath the sliding surface 16 of the flume 10 and the reaction plate 32 being mounted at the bottom of the ride vehicle 20, the LIM units 30 may be mounted outside of and parallel to the side walls 18 of the flume 10 and the reaction plates 32 may be mounted to the ride vehicle 20 such that they are parallel to the side walls 18 of the flume when the ride vehicle 20 is in the flume 10.

It is to be understood that while the LIM in the illustrated embodiment is used to maintain the speed of, or to accelerate the ride vehicle 20, the LIM can also be used to impart other motion control to the vehicle 20. For example, the LIM can be used to decelerate the ride vehicle 20, resist acceleration of the ride vehicle 20 down a slope, or indeed to stop it or reverse its direction. Further, in other LIM unit 30 and reaction plate 32 configurations, the LIM 30 can be used to cause the ride vehicle 20 to rotate or change its angular direction. For example the linear motor force could be arranged off center so that a turning moment is created in the reaction plate 32. Alternatively, adjacent LIM units 30 could thrust in opposite directions to create the turning moment. Additionally, the selective operation of multiple LIM unit sets in angular relationship to each other can cause the ride vehicle 20 to selectively follow different trajectories. The LIM can also be used to cause or assist the ride vehicle 20 in going around corners. Of course, a combination of these motions can also be implemented, for example a LIM which causes the ride vehicle 20 to rotate as it decelerates, or a LIM which causes the ride vehicle 20 to accelerate as it goes around a corner, as shown in FIG. 8.

Figure 10:
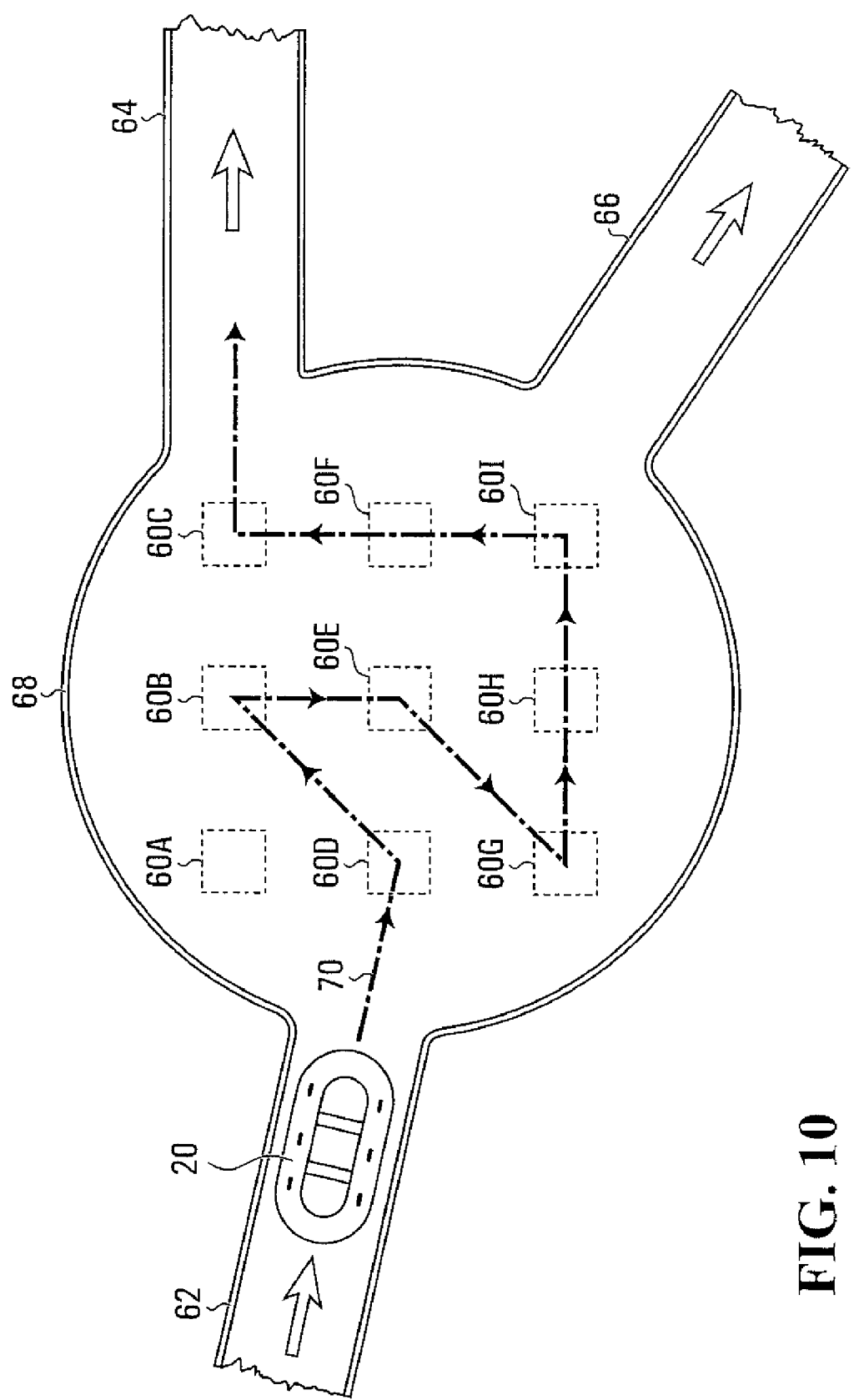
FIG. 10 is a schematic representation of a sixth embodiment of the present invention.

FIG. 10 illustrates a use of an array of LIM units 60A to 60J to slide the ride vehicle 20 on a horizontal ride surface 68. The array of LIM units 60A to 60J are positioned at or just below the ride surface 68. The ride vehicle 20 enters the ride surface 68 through an entrance 62. The LIM units 60A to 60J are energized to move the ride vehicle 20 across the ride surface 68 and out through one of the exits 64 and 66. The selection of the exit 64 or 66 may be determined by user input or by the ride operator. The energizing of the LIM units 60A to 60J may cause the vehicle 20 to move back and forth across the ride surface 68. For example, the vehicle 20 may follow a path such as path 70.

Figure 11:
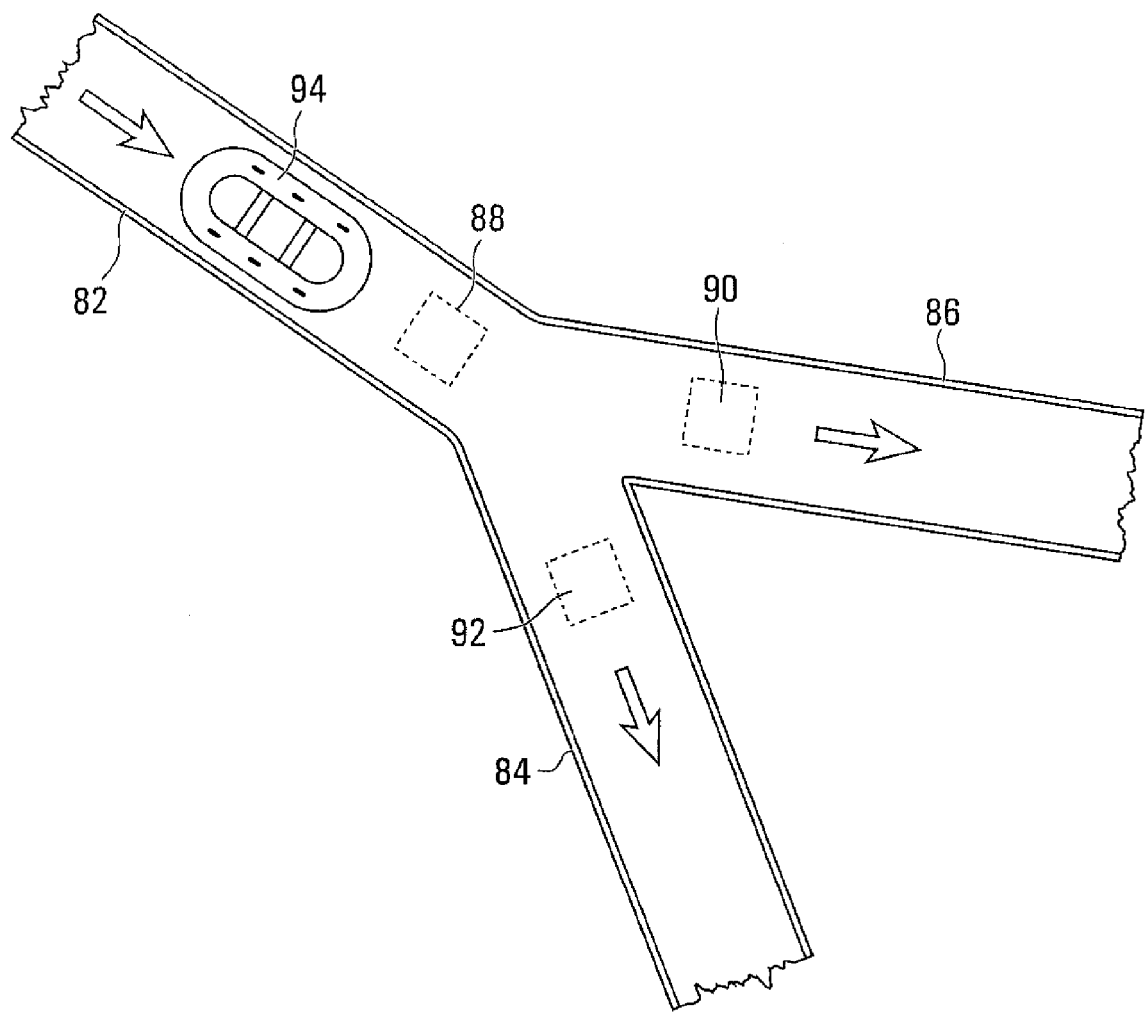
FIG. 11 is a schematic representation of a seventh embodiment of the present invention.

Another embodiment with multiple paths is depicted in FIG. 11. FIG. 11 depicts a flume style water ride 80. The ride 80 has an upper section 82 and first and second lower sections 84 and 86. The upper section 82 has a LIM unit 88 at the flume surface adjacent the end of the section. The first lower section 84 has a LIM unit 92 at the flume surface adjacent the start of that section. The second lower section 86 has a LIM unit 90 at the flume surface adjacent the start of that section. In this example, a raft 94 is traveling down the upper section 82. The raft 94 incorporates a reaction plate (not shown). The raft 94 can travel into either the first lower section 84 or the second lower section 86. The selection of the path may be made by the ride operator or by the user. If the first lower section 84 is selected, the LIM units 88 and 92 will be energized to direct the raft into the first lower section 84. If the second lower section 86 is selected, the LIM units 88 and 90 will be energized to direct the raft into the second lower section 86. It will be understood that more paths may be provided and that the multipath embodiment is applicable to other transportation systems. The number and type and positions of LIM units may be varied to provide the required control of the path of the raft 94 or other vehicle.

Figure 12:
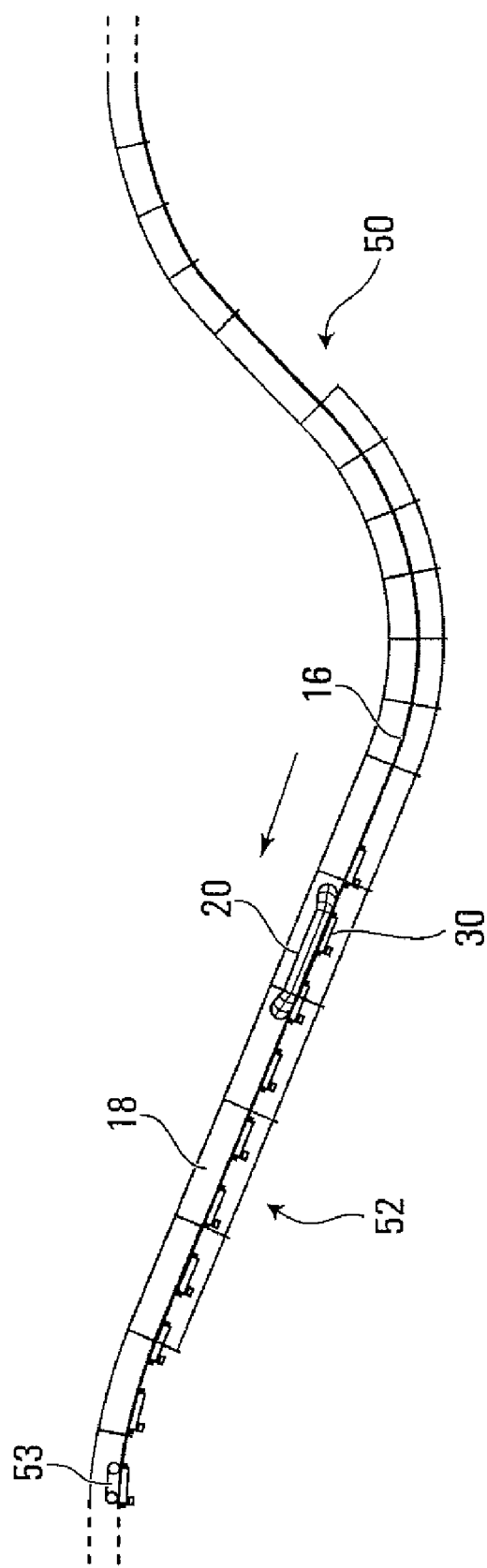
FIG. 12 is a side view of a flume ride feature in accordance with a method of the present invention.

Alternatively, as illustrated in FIG. 12, the LIM can be used to provide other ride motion. For example, in a ride feature comprising a downhill section 50 followed by an uphill section 52, as the vehicle 20 proceeds down the downhill section 50 and up the uphill section 52, the LIM may be operated such that the vehicle 20 reaches a certain height. The LIM may then be deactivated, causing the vehicle 20 to slide backwards down the uphill section 52 and up the downhill section 50. The vehicle 20 will then slide back down the downhill section 50 and up the uphill section 52 whereupon the LIM may be reactivated such that the vehicle 20 reaches the top of the uphill section 52 at a desired speed. The top of the uphill section 52 may contain a wheel or roller based or other locking system 53 which can override the LIM and hold the raft 20 stationary. The locking system 53 may also be utilized at the beginning or end of a ride where people or objects are loaded onto or out of the vehicle. The rollers may be locked by an external means to stop the rolling movement of the vehicle. LIM units may be mounted inside the rollers such that if the "lock" is removed or disengaged, the vehicle, if acted upon by, the LIM units, would start to move in that direction. For example, the vehicle could sit over these rollers, with the rollers in a "locked" state based upon the programming of the system. Once the vehicle is loaded, the lock would be removed and the LIM units would be energized to start the forward motion of the vehicle. Proximity sensors could measure the vehicles movement and speed to ensure that the vehicle has enough forward speed to be properly introduced into the ride. This roller system may only be supplied for a short distanced and then the vehicle would be introduced into the flume.

Figure 13:
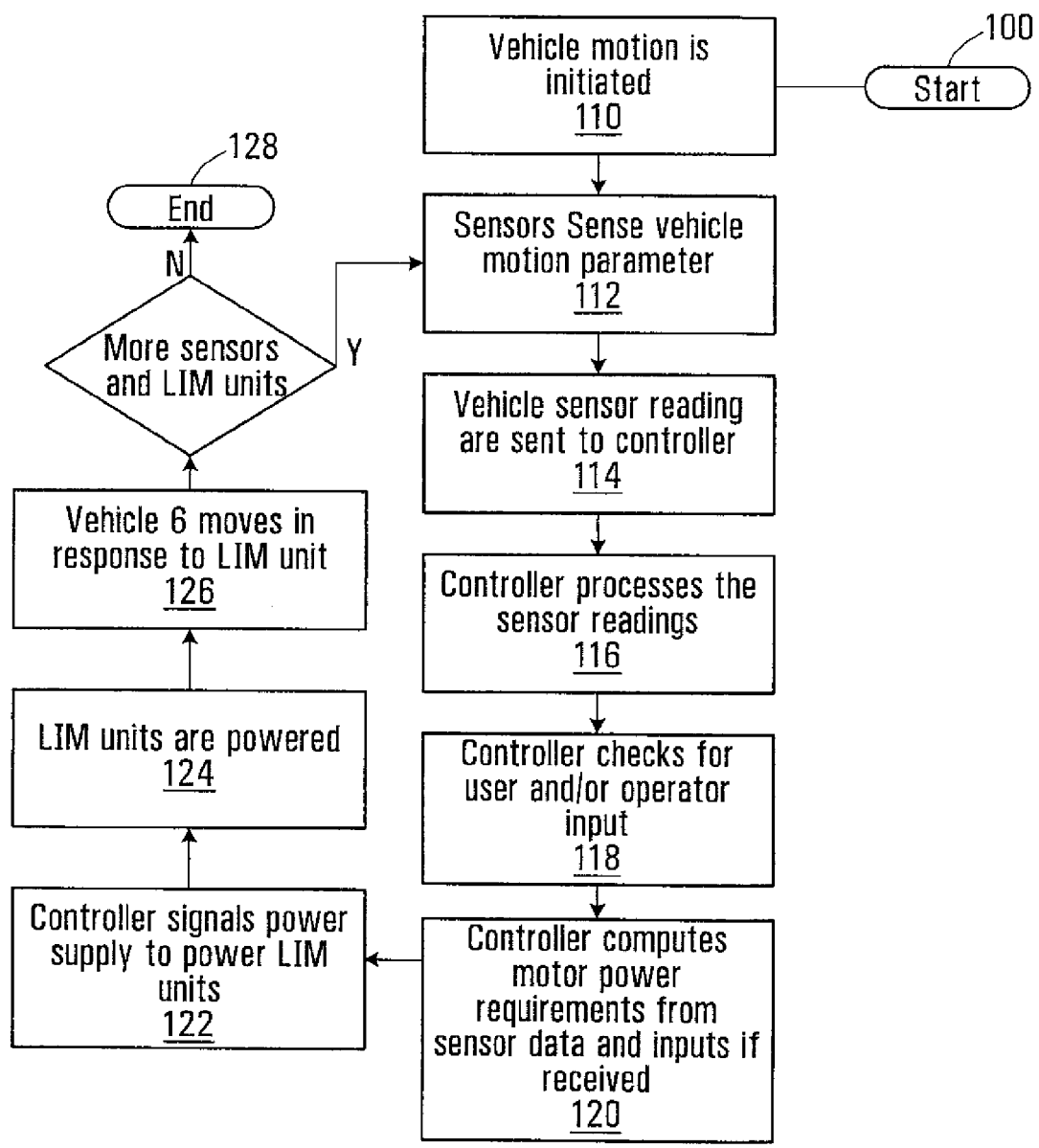
FIG. 13 is a flow chart of an exemplary method of operating a linear motor driven system of an embodiment of the present invention.

FIG. 13 provides a flow chart of an exemplary method of operating a linear motor driven system of an embodiment of the design. The method starts at step 100. In step 110, the motion of the vehicle is initiated. In step 112, sensors sense at least one vehicle motion parameter. In step 114, the sensor readings are sent to a controller. In step 116, the controller processes the sensor readings. In step 118, the controller checks for user input or operator input through a user or operator interface. In step 120, the controller computes the required motor input based on the sensor readings and any inputs. In step 122, the controller signals the power supply to appropriately power the LIM units. In step 124, the LIM units are powered. In step 126, the vehicle moves in response to the LIM units. If there are more sensors and LIM units in the system which the vehicle has not passed then the method will return to step 112. Otherwise, the method will end at 128. It will be appreciated that steps may be added to or omitted from this method. For example the system may not have user and operator inputs. The method may also incorporate steps of stopping and restarting the power to the LIM units.

While the vehicle 20 has been illustrated as a flat-bottomed raft, it is to be understood that the vehicle 20 in accordance with the present invention can be any vehicle adapted to convey at least one person or object in a sliding motion. For example, a rider in a sliding amusement ride, including an inner-tube-style vehicle, a multi-rider vehicle, or a platform vehicle. Other examples are pallets for objects in industrial conveying or enclosed cars for public transportation of people.

While the linear induction motor drive has been described in the as comprising linear induction motor units 30 embedded below the sliding surface 16 and the reaction plate 32 mounted at the bottom of the ride vehicle 20, it is to be understood that other suitable configurations are possible. For example, the linear induction motor units 30 may be mounted at the bottom of the ride vehicle 20 as powered by batteries and controlled remotely, with multiple reaction plates 32 mounted beneath the surface of the ride surface 16.

While the flume 10, the LIM units 30, the reaction plate 32, and other features have been described in some cases as having particular dimensions and being made of particular materials, it will be understood by persons skilled in the art that other dimensions and materials may be used without necessarily departing from the scope of the present invention.

Finally, specific details of the particular LIM utilised in the preferred embodiment of the invention have been provided. However, persons skilled in the art will understand that other types of LIMs having different configurations, specifications, and dimensions can be utilized without necessarily departing from the scope of the present invention.

While induction type linear motors have been described in some detail, it will be appreciated that other types of linear motors, including linear synchronous may be used.

Numerous modifications and variations of the present invention are possible in light of the above teachings. It is therefore to be understood that within the scope of the appended claims, the invention may be practiced otherwise than as specifically described herein.

The invention claimed is:
1. A vehicle motion control system comprising:
   a guideway, said guideway including side walls and a sliding surface;
   a vehicle including a body riding within said guideway, at least a portion of an underside of said body adapted to slide on said sliding surface;
   a film of lubricating water in said guideway to facilitate the sliding of said vehicle body; and
   a linear motor associated with the vehicle and the sliding surface for affecting sliding motion of the vehicle on the sliding surface;
   wherein the linear motor comprises at least one linear motor unit located with the sliding surface and at least one reaction component affixed to the vehicle.
2. The system of claim 1 wherein the linear motor comprises a linear induction motor.
3. The system of claim 2 further comprising a lubricant between the vehicle and the sliding surface.
4. The system of claim 2 further comprising a sensor for detecting at least one of linear speed, angular speed, direction of movement and position of the vehicle.
5. The system of claim 4 further comprising a controller for operating the linear motor as a function of input from the sensor.
6. The system of claim 1 wherein the linear motor comprises a linear synchronous motor.
7. The system of claim 1 further comprising a lubricant between the vehicle and the sliding surface.
8. The system of claim 7 wherein the lubricant is water.
9. The system of claim 1 further comprising a sensor for detecting at least one of linear speed, angular speed, direction of movement and position of the vehicle.
10. The system of claim 9 further comprising a controller for operating the linear motor as a function of input from the sensor.
11. The system of claim 1 further comprising a user input means.
12. The system of claim 11 further comprising a controller for operating the linear motor as a function of user input.
13. A method of controlling motion of a vehicle sliding on a sliding surface comprising
    forming a guideway including side walls and said sliding surface;
    placing a body of said vehicle to ride in said guideway such that at least a portion of an underside of said body is adapted to slide on said sliding surface;
    placing a film of lubricating water in said guideway to facilitate the sliding of said vehicle body; and
    operating a linear motor associated with the vehicle and the sliding surface;
    wherein the linear motor comprises at least one linear motor unit located with the sliding surface and at least one reaction component affixed to the vehicle.
14. The method of claim 13 wherein the linear motor comprises a linear induction motor.
15. The method of claim 14 wherein the sliding surface is a sliding surface of an amusement ride.
16. The method of claim 15 further comprising altering the operation of the linear motor in response to input from a vehicle rider.
17. The method of claim 16 further comprising receiving the input from the vehicle rider through rider operated controls.
18. The method of claim 14 further comprising sensing at least one of linear speed, angular speed, direction of movement and position of the vehicle and altering the operation of the linear induction motor in response.
19. The method of claim 14 wherein controlling motion comprises at least one of accelerating the vehicle, decelerating the vehicle, rotating the vehicle, changing direction of movement of the vehicle, maintaining a speed of the vehicle, and reversing the direction of movement of the vehicle.

20. A method for conveying people comprising the method of claim 14.

21. A method for public transportation of people comprising the method of claim 14.

22. A method of industrial conveying comprising the method of claim 14.

23. A method for preventing movement of the vehicle outside the designated area comprising the method of claim 14.

24. The method of claim 13 wherein the linear motor comprises a linear synchronous motor.

25. The method of claim 13 wherein the sliding surface is a sliding surface of an amusement ride.

26. The method of claim 25 further comprising altering the operation of the linear motor in response to input from a vehicle rider.

27. The method of claim 25 to launch the vehicle up an incline.

28. A method for returning the vehicle to a ride starting location comprising the method of claim 25.

29. The method of claim 25 further comprising thrusting with water sprayers.

30. The method of claim 13 further comprising sensing at least one of linear speed, angular speed, direction of movement and position of the vehicle and altering the operation of the linear motor in response.

31. The method of claim 13 wherein controlling motion comprises at least one of accelerating the vehicle, decelerating the vehicle, rotating the vehicle, changing direction of movement of the vehicle, maintaining a speed of the vehicle, and reversing the direction of movement of the vehicle.

32. The method of claim 13 for conveying people.

33. The method of claim 13 for public transportation of people.

34. The method of claim 13 in an industrial conveyance system.

35. The method of claim 13 to prevent movement of the vehicle outside a designated area.

36. A method of controlling motion of a vehicle sliding on a sliding surface comprising operating a linear motor associated with the vehicle and the sliding surface; wherein the linear motor comprises at least one linear motor unit located with the sliding surface and at least one reaction component affixed to the vehicle; wherein the linear motor comprises a linear induction motor; wherein the sliding surface is a sliding surface of an amusement ride; further comprising altering the operation of the linear motor in response to input from a vehicle rider; and further comprising receiving the input from the vehicle rider through force applied by the rider to a vehicle body.

37. The method of claim 36 wherein the vehicle body incorporates the at least one reaction component and the force applied by the rider alters the shape of the at least one reaction component.

38. A method of controlling motion of a vehicle sliding on a sliding surface comprising operating a linear motor associated with the vehicle and the sliding surface; wherein the linear motor comprises at least one linear motor unit located with the sliding surface and at least one reaction component affixed to the vehicle; wherein the linear motor comprises a linear induction motor; wherein the sliding surface is a sliding surface of an amusement ride; further comprising altering the operation of the linear motor in response to input from a vehicle rider; and wherein the vehicle body incorporates the at least one reaction component and the input from the rider alters electrical characteristics of the at least one reaction component.

39. The method of claim 38 wherein the reaction component comprises conductive coils.

40. A method of controlling motion of a vehicle sliding on a sliding surface comprising operating a linear motor associated with the vehicle and the sliding surface; wherein the linear motor comprises at least one linear motor unit located with the sliding surface and at least one reaction component affixed to the vehicle; wherein the linear motor comprises a linear induction motor; wherein the sliding surface is a sliding surface of an amusement ride; and wherein the at least one linear motor unit comprises a plurality of induction units associated with the sliding surface and the method further comprises energizing the induction units to define a path of the vehicle.

41. The method of claim 40 wherein the amusement ride comprises a bowl shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

42. The method of claim 41 wherein the induction units are positioned at an exit from the bowl shaped sliding surface, the method further comprising energizing the induction units to decelerate the vehicle.

43. The method of claim 40 wherein the amusement ride comprises a funnel shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

44. The method of claim 43 wherein the induction units are positioned at an exit from the funnel shaped sliding surface, the method further comprising energizing the induction units to decelerate the vehicle.

45. The method of claim 40 wherein the amusement ride comprises a planar sliding surface and wherein the induction units are positioned at the sliding surface, the method further comprises energizing the induction units to define a path of the vehicle over the planar sliding surface.

46. A vehicle motion control system for an amusement ride comprising:
  a guideway, said guideway including side walls and a sliding surface;
    a vehicle including a body riding within said guideway, at least a portion of an underside of said body adapted to slide on said sliding surface;
    a film of lubricating water in said guideway to facilitate the sliding of said vehicle body; and
    a linear motor associated with the vehicle and the sliding surface for affecting sliding motion of the vehicle on the sliding surface;
    wherein the linear motor comprises at least one linear motor unit located with the sliding surface and at least one reaction component affixed to the vehicle.

47. The system of claim 46 further comprising a lock to override the linear motor.

48. The system of claim 46 wherein the at least one linear motor unit comprises a plurality of induction units.

49. The system of claim 48 wherein the sliding surface incorporates at least two exits and the induction units are adapted to selectively direct the vehicle to one of the at least two exits.

50. The system of claim 48 wherein the induction units are adapted to selectively exert a thrust on the vehicle in at least two different directions.

51. The system of claim 50 wherein the thrust exerted by the induction units is reversible.

52. The system of claim 48 wherein the induction units are adapted the remove and reintroduce thrust.

53. A vehicle motion control system for an amusement ride comprising:
- a sliding surface;
- a vehicle adapted to slide on said sliding surface; and
- a linear motor associated with the vehicle and the sliding surface for affecting sliding motion of the vehicle on the sliding surface;
- wherein the linear motor comprises at least one linear motor unit located with the sliding surface and at least one reaction component affixed to the vehicle;

wherein the at least one linear motor unit comprises a plurality of induction units; and wherein the sliding surface is a bowl shaped sliding surface and the induction units are positioned at the sliding surface and adapted to at least decelerate the rate of decent of the vehicle, increase an angular speed of the vehicle and reverse the angular direction of the vehicle.

54. The system of claim 53 wherein at least a portion of the plurality of induction units are positioned around a designated riding area and adapted to retain the vehicle within the designated riding area.

55. A vehicle motion control system for an amusement ride comprising:
- a sliding surface;
- a vehicle adapted to slide on said sliding surface; and
- a linear motor associated with the vehicle and the sliding surface for affecting sliding motion of the vehicle on the sliding surface;
- wherein the linear motor comprises at least one linear motor unit located with the sliding surface and at least one reaction component affixed to the vehicle;

wherein the at least one linear motor unit comprises a plurality of induction units; and wherein the sliding surface is a funnel shaped sliding surface and the induction units are positioned at the sliding surface and adapted to at least one of decelerate a rate of decent of the vehicle, increase an angular speed of the vehicle and reverse the angular direction of the vehicle.

56. The system of claim 55 wherein at least a portion of the plurality of induction units are positioned around a designated riding area and adapted to retain the vehicle within the designated riding area.

57. A vehicle motion control system for an amusement ride comprising:
- a sliding surface;
- a vehicle adapted to slide on said sliding surface; and
- a linear motor associated with the vehicle and the sliding surface for affecting sliding motion of the vehicle on the sliding surface;
- wherein the linear motor comprises at least one linear motor unit located with the sliding surface and at least one reaction component affixed to the vehicle;

wherein the at least one linear motor unit comprises a plurality of induction units;

wherein the sliding surface is a planar surface and the induction units are positioned at the sliding surface and adapted to move the vehicle across the sliding surface; and wherein the planar surface has at least two exits and the induction units are adapted to selectively direct the vehicle to one of the at least two exits.

58. A vehicle motion control system for an amusement ride comprising:
- a sliding surface;
- a vehicle adapted to slide on said sliding surface; and
- a linear motor associated with the vehicle and the sliding surface for affecting sliding motion of the vehicle on the sliding surface;
- wherein the linear motor comprises at least one linear motor unit located with the sliding surface and at least one reaction component affixed to the vehicle;

wherein the at least one linear motor unit comprises a plurality of induction units; and wherein the sliding surface comprises an upward incline followed by a turn and the induction units are positioned at the surface of the upward incline and the turn and adapted to propel the vehicle up the incline and around the turn.

59. A vehicle motion control system for an amusement ride comprising:
- a sliding surface;
- a vehicle adapted to slide on said sliding surface; and
- a linear motor associated with the vehicle and the sliding surface for affecting sliding motion of the vehicle on the sliding surface;
- wherein the linear motor comprises at least one linear motor unit located with the sliding surface and at least one reaction component affixed to the vehicle;

wherein the at least one linear motor unit comprises a plurality of induction units; and wherein the sliding surface comprises a sliding surface of a flume ride having at least two exits and the induction units are adapted to selectively direct the vehicle to one of the at least two exits.

* * * * *

UNITED STATES PATENT AND TRADEMARK OFFICE
CERTIFICATE OF CORRECTION

PATENT NO.      : 8,136,453 C1
APPLICATION NO. : 95/002419
DATED           : May 20, 2014
INVENTOR(S)     : Richard D. Hunter et al.

Page 1 of 1

It is certified that error appears in the above-identified patent and that said Letters Patent is hereby corrected as shown below:

In the Claims:

Claim 1, col. 1, line 53, "sidewalls" should read --side walls--.

Claim 74, col. 4, line 11, "the riders" should read --the rider--.

Claim 75, col. 4, line 30, "rate of decent" should read --rate of descent--.

Claim 76, col. 4, line 50, "rate of decent" should read --rate of descent--.

Claim 77, col. 5, line 7, "rate of decent" should read --rate of descent--.

Claim 78, col. 6, line 1, "rate of decent" should read --rate of descent--.

Signed and Sealed this
Sixteenth Day of September, 2014

Michelle K. Lee
*Deputy Director of the United States Patent and Trademark Office*

(12) INTER PARTES REEXAMINATION CERTIFICATE (881st)
United States Patent
Hunter et al.

(10) Number: US 8,136,453 C1
(45) Certificate Issued: May 20, 2014

(54) LINEAR MOTOR DRIVEN SYSTEM AND METHOD

(75) Inventors: Richard D. Hunter, Ottawa (CA); Andreas Tanzer, Gatineau (CA)

(73) Assignee: HM Attractions Inc., Ottawa (CA)

Reexamination Request:
No. 95/002,419, Sep. 15, 2012

Reexamination Certificate for:
Patent No.: 8,136,453
Issued: Mar. 20, 2012
Appl. No.: 11/681,702
Filed: Mar. 2, 2007

Related U.S. Application Data

(60) Provisional application No. 60/778,384, filed on Mar. 3, 2006.

(51) Int. Cl.
*A63G 1/00* (2006.01)

(52) U.S. Cl.
USPC .................................. 104/60; 104/53; 104/73

(58) Field of Classification Search
None
See application file for complete search history.

(56) References Cited

To view the complete listing of prior art documents cited during the proceeding for Reexamination Control Number 95/002,419, please refer to the USPTO's public Patent Application Information Retrieval (PAIR) system under the Display References tab.

*Primary Examiner* — Jimmy G. Foster

(57) ABSTRACT

A vehicle motion control system comprising: a sliding surface; a vehicle adapted to slide on said sliding surface; and a linear motor associated with the vehicle and the sliding surface for affecting sliding motion of the vehicle on the sliding surface.

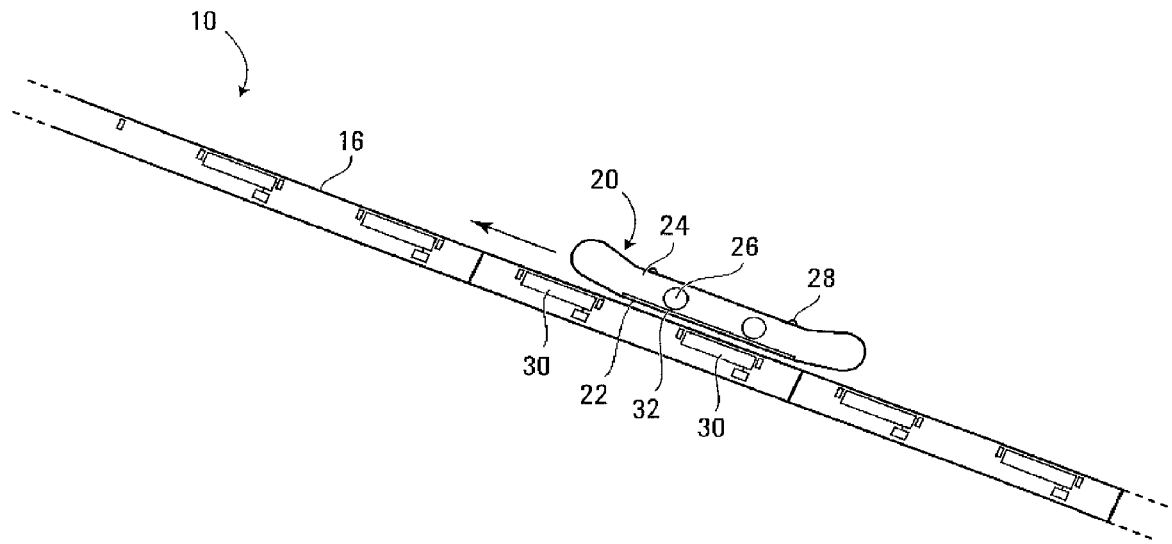

INTER PARTES
REEXAMINATION CERTIFICATE
ISSUED UNDER 35 U.S.C. 316

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 5, 7-10 and 13-35 are cancelled.

Claims 1, 36, 40, 46, 58 and 59 are determined to be patentable as amended.

Claims 2, 3, 6, 11, 12, 45 and 47-52, dependent on an amended claim, are determined to be patentable.

New claims 60-79 are added and determined to be patentable.

Claims 37-39, 41-44 and 53-57 were not reexamined.

1. A vehicle motion control system *of a waterslide amusement ride* comprising:
   a [guideway] *waterslide flume*, said [guideway] *waterslide flume* including *a pair of* side walls and a sliding surface;
   a vehicle including a body riding within said [guideway] *waterslide flume*, at least a portion of an underside of said body adapted to slide on said sliding surface;
   a film of lubricating water in said [guideway] *waterslide flume* to facilitate the sliding of said vehicle body; and
   a linear motor associated with the vehicle and the sliding surface for affecting sliding motion of the vehicle on the sliding surface;
   wherein the linear motor comprises at least one linear motor unit located with the sliding surface and at least one reaction component affixed to the vehicle;
   *the waterslide amusement ride comprising a first section and second section, wherein the second section is an uphill section and preceded by the first section,*
   *the first section comprising sensors for detecting at least one of linear speed, angular speed, direction of movement, and position of the vehicle;*
   *a processor that receives at least one input from said sensors;*
   *a controller that operates the linear motor as a function of the input received from the sensors;*
   *wherein the linear motor propels the vehicle up the uphill section as the vehicle slides on the sliding surface;*
   *wherein the pair of sidewalls extend upward from the waterslide sliding surface; and*
   *wherein the waterslide sliding surface is configured such that when the vehicle slides on the waterslide sliding surface, the vehicle is substantially between the pair of side walls.*
36. A method of controlling motion of a vehicle sliding on a *waterslide* sliding surface comprising operating a linear motor associated with the vehicle and the sliding surface *to propel the vehicle as the vehicle slides on the sliding surface*; wherein the linear motor comprises at least one linear motor unit located with the sliding surface and at least one reaction component affixed to the vehicle; wherein the linear motor comprises a linear induction motor; wherein the sliding surface is a sliding surface of [an] *a waterslide* amusement ride;
further comprising altering the operation of the linear motor in response to input from a vehicle rider; and further comprising receiving the input from the vehicle rider through force applied by the rider to a vehicle body.

40. A method of controlling motion of a vehicle sliding on a *waterslide* sliding surface comprising operating a linear motor associated with the vehicle and the sliding surface *to propel the vehicle as the vehicle slides on the sliding surface*;
   wherein the linear motor comprises at least one linear motor unit located with the sliding surface and at least one reaction component affixed to the vehicle; wherein the linear motor comprises a linear induction motor; wherein the sliding surface is a sliding surface of [an] *a waterslide* amusement ride; and wherein the at least one linear motor unit comprises a plurality of induction units associated with the sliding surface and the method further comprises energizing the induction units to define a path of the vehicle.

46. A vehicle motion control system [for an] *of a waterslide* amusement ride comprising:
   a guideway, said guideway including *a pair of* side walls and a *waterslide* sliding surface;
   a vehicle including a body riding within said guideway, at least a portion of an underside of said body adapted to slide on said sliding surface *of the waterslide amusement ride*;
   a film of lubricating water in said guideway to facilitate the sliding of said vehicle body; and
   a linear motor associated with the vehicle and the sliding surface for affecting sliding motion of the vehicle on the sliding surface;
   wherein the linear motor comprises at least one linear motor unit located with the sliding surface and at least one reaction component affixed to the vehicle*;*
   *wherein the pair of side walls extend upward from the waterslide sliding surface; and*
   *wherein the waterslide sliding surface is configured such that when the vehicle slides on the waterslide sliding surface, the vehicle is substantially between the pair of side walls.*

58. A vehicle motion control system [for an] *of a waterslide* amusement ride comprising:
   a *waterslide* sliding surface;
   a vehicle adapted to slide on said sliding surface *of the waterslide amusement ride*; and
   a linear motor associated with the vehicle and the sliding surface for affecting sliding motion of the vehicle on the sliding surface;
   wherein the linear motor comprises at least one linear motor unit located with the sliding surface and at least one reaction component affixed to the vehicle;
   wherein the at least one linear motor unit comprises a plurality of induction units; [and]
   wherein the sliding surface comprises an upward incline followed by a turn and the induction units are positioned at the surface of the upward incline and the turn and adapted to propel the vehicle up the incline and around the turn*;*
   *wherein the linear motor propels the vehicle up the upward incline as the vehicle slides on the sliding surface; and*
   *wherein the sliding surface is planar.*

59. A vehicle motion control system [for an] *of a waterslide* amusement ride comprising;
   a *waterslide* sliding surface;
   a vehicle adapted to slide on said sliding surface *of the waterslide amusement ride*; and a linear motor associated with the vehicle and the sliding surface for affecting sliding motion of the vehicle on the sliding surface;
wherein the linear motor comprises at least one linear motor unit located with the sliding surface and at least one reaction component affixed to the vehicle;
wherein the at least one linear motor unit comprises a plurality of induction units; [and]
wherein the *waterslide* sliding surface comprises a sliding surface of a flume ride having at least two exits and the induction units are adapted to selectively direct the vehicle to one of the at least two exits;
wherein the linear motor propels the vehicle as the vehicle slides on the sliding surface; and
wherein said vehicle is adapted to convey at least one rider within the flume ride.

60. The system of claim 46, wherein each of the pair of side walls has a height; and
wherein when the vehicle slides on the waterslide sliding surface, the vehicle rider is at least partially below the height of each side wall.

61. The system of claim 46, wherein each of the pair of side walls has a height; and
wherein when the vehicle slides on the waterslide sliding surface, the vehicle is substantially below the height of each side wall.

62. The system of claim 46, wherein at least one side wall of the pair of side walls includes at least one spray nozzle configured to supply water lubricant on the waterslide sliding surface.

63. The system of claim 46, wherein the waterslide sliding surface descends into a splash pool.

64. The system of claim 46, wherein the vehicle is a raft.

65. The system of claim 46, wherein the vehicle is an inner-tube style vehicle.

66. The system of claim 46, wherein the vehicle has a width and the waterslide sliding surface has a width and said sliding surface width is greater than said vehicle width.

67. The method of claim 79, wherein the amusement ride further comprises a lubricant between the vehicle and the sliding surface.

68. The method of claim 79, wherein the amusement ride further comprises a sensor for detecting at least one of linear speed, angular speed, direction of movement and position of the vehicle.

69. The method of claim 68, wherein the amusement ride further comprises a controller for operating the linear induction motor as a function of input from the sensor.

70. The method of claim 79, further comprising altering the operation of the linear induction motor in response to input from a vehicle rider.

71. The method of claim 70, further comprising receiving the input from the vehicle rider through rider operated controls.

72. The method of claim 79, further comprising sensing at least one of linear speed, angular speed, direction of movement and position of the vehicle and altering the operation of the linear induction motor in response.

73. The method of claim 79, wherein controlling motion comprises at least one of accelerating the vehicle, decelerating the vehicle, rotating the vehicle, changing the direction of movement of the vehicle, maintaining speed of the vehicle, and reversing the direction of movement of the vehicle.

74. A method of controlling motion of a vehicle sliding on a waterslide sliding surface comprising operating a linear motor associated with the vehicle and the sliding surface;
wherein the linear motor comprises at least one linear motor unit located with the sliding surface and at least one reaction component affixed to the vehicle;
wherein the linear motor comprises a linear induction motor; wherein the sliding surface is a sliding surface of a waterslide amusement ride; further comprising altering the operation of the linear motor in response to input from a vehicle rider; and further comprising receiving the input from the vehicle rider through force applied by the rider to a vehicle body;
wherein the vehicle body incorporates the at least one reaction component and the force applied by the riders alters the shape of the at least one reaction component.

75. A method of controlling motion of a vehicle sliding on a waterslide sliding surface comprising operating a linear motor associated with the vehicle and the sliding surface;
wherein the linear motor comprises at least one linear motor unit located with the sliding surface and at least one reaction component affixed to the vehicle; wherein the linear motor comprises a linear induction motor; wherein the sliding surface is a sliding surface of a waterslide amusement ride; and wherein the at least one linear motor unit comprises a plurality of induction units associated with the sliding surface and the method further comprises energizing the induction units to define a path of the vehicle;
wherein the amusement ride comprises a bowl shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

76. A method of controlling motion of a vehicle sliding on a waterslide sliding surface comprising operating a linear motor associated with the vehicle and the sliding surface;
wherein the linear motor comprises at least one linear motor unit located with the sliding surface and at least one reaction component affixed to the vehicle; wherein the linear motor comprises a linear induction motor; wherein the sliding surface is a sliding surface of a waterslide amusement ride; and wherein the at least one linear motor unit comprises a plurality of induction units associated with the sliding surface and the method further comprises energizing the induction units to define a path of the vehicle;
wherein the amusement ride comprises a bowl shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle; and
wherein the induction units are positioned at an exit from the bowl shaped sliding surface, the method further comprising energizing the induction units to decelerate the vehicle.

77. A method of controlling motion of a vehicle sliding on a waterslide sliding surface comprising operating a linear motor associated with the vehicle and the sliding surface;
wherein the linear motor comprises at least one linear motor unit located with the sliding surface and at least one reaction component affixed to the vehicle; wherein the linear motor comprises a linear induction motor; wherein the sliding surface is a sliding surface of a waterslide amusement ride; and wherein the at least one linear motor unit comprises a plurality of induction units associated with the sliding surface and the method further comprises energizing the induction units to define a path of the vehicle;

wherein the amusement ride comprises a funnel shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

78. A method of controlling motion of a vehicle sliding on a waterslide sliding surface comprising operating a linear motor associated with the vehicle and the sliding surface;

wherein the linear motor comprises at least one linear motor unit located with the sliding surface and at least one reaction component affixed to the vehicle; wherein the linear motor comprises a linear induction motor; wherein the sliding surface is a sliding surface of a waterslide amusement ride; and wherein the at least one linear motor unit comprises a plurality of induction units associated with the sliding surface and the method further comprises energizing the induction units to define a path of the vehicle;

wherein the amusement ride comprises a funnel shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle; and wherein the induction units are positioned at an exit from the funnel shaped sliding surface, the method further comprising energizing the induction units to decelerate the vehicle.

79. A method of controlling motion of a vehicle sliding on a waterslide sliding surface comprising operating a linear motor associated with the vehicle and the sliding surface;

wherein the linear motor comprises at least one linear motor unit located with the sliding surface and at least one reaction component affixed to the vehicle; wherein the linear motor comprises a linear induction motor; wherein the sliding surface is a sliding surface of a waterslide amusement ride; and wherein the at least one linear motor unit comprises a plurality of induction units associated with the sliding surface and the method further comprises energizing the induction units to define a path of the vehicle;

wherein the amusement ride comprises a planar sliding surface and wherein the induction units are positioned at the sliding surface, the method further comprises energizing the induction units to define a path of the vehicle over the planar sliding surface.

* * * * *